(12) United States Patent
Laumen et al.

(10) Patent No.: US 7,574,203 B2
(45) Date of Patent: Aug. 11, 2009

(54) METHOD FOR RETRIEVING AND DELIVERING MULTIMEDIA MESSAGES USING THE SESSION INITIATION PROTOCOL

(75) Inventors: Josef Laumen, München (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 638 days.

(21) Appl. No.: 10/578,557

(22) PCT Filed: Nov. 6, 2003

(86) PCT No.: PCT/EP03/12439

§ 371 (c)(1),
(2), (4) Date: May 8, 2006

(87) PCT Pub. No.: WO2005/046192

PCT Pub. Date: May 19, 2005

(65) Prior Publication Data

US 2008/0293441 A1  Nov. 27, 2008

(51) Int. Cl.
H04M 1/725 (2006.01)

(52) U.S. Cl. .............. 455/412.1; 455/414.3; 455/466; 455/414.1; 370/349; 370/389; 370/471; 709/206; 709/227

(58) Field of Classification Search ... 455/414.1–414.3, 455/466, 412.1, 412.2; 370/349, 389, 471; 709/206, 230

See application file for complete search history.

(56) References Cited

U.S. PATENT DOCUMENTS

2004/0103157 A1* 5/2004 Requena et al. ............ 709/206

FOREIGN PATENT DOCUMENTS

| WO | 02/01474 | 1/2002 |
|---|---|---|
| WO | WO 02/062026 A1 | 8/2002 |
| WO | WO 02/063838 A2 | 8/2002 |

OTHER PUBLICATIONS

ETSI TS 122 140 V5.2.0; Universal Mobile Telecommunications System (UMTS), Multimedia Messaging Service (MMS); Technical Specification 2002 pp. 1-15; XP002225280.
ETSI TS 123 140 V4.2.0 (Mar. 2001) Universal Mobile Telecommunications System (UMTS); Multimedia messaging Service (MMS); Functional description Stage 2, ( 3GPP TS 23.140 version 4.2.0. Release 4), Mar. 2001 XP002180514.

* cited by examiner

*Primary Examiner*—George Eng
*Assistant Examiner*—Marcos L Torres
(74) *Attorney, Agent, or Firm*—Staas & Halsey LLP

(57) ABSTRACT

A method for retrieving an MMS message, to be executed at an MMS User Agent, involves: generating an MMS subscription request; sending said MMS subscription request to an MMS server; receiving an MMS notification of an MMS message from the MMS server; in response to receiving said MMS notification, generating an MMS message retrieval request for retrieving said MMS message; sending said MMS message retrieval request to the MMS Server; receiving an MMS message retrieval comprising said MMS message; and in response to receiving said MMS message retrieval from the MMS Server, sending an acknowledgment to the MMS Server. herein the improvement is that: The MMS subscription request is sent using a SIP method SUBSCRIBE. The MMS notification is received using a SIP method NOTIFY. The MMS message retrieval request is sent using a SIP method FETCH. The acknowledgment is sent using a SIP method INFORM.

8 Claims, 3 Drawing Sheets

METHOD FOR RETRIEVING AND DELIVERING MULTIMEDIA MESSAGES USING THE SESSION INITIATION PROTOCOL

FIELD OF THE INVENTION

The invention relates to retrieving and delivering of multimedia messages using the Session Initiation Protocol.

DISCUSSION OF BACKGROUND ART

Multimedia Messaging Service MMS has in its present form been defined in standard 3GPP TS 23.140 "3rd Generation Partnership Project; Technical Specification Group Terminals; Multimedia Messaging Service (MMS); Functional description; Stage 2 (Release 6)". The architecture of the networks involved as well as functions of different modules, especially the MMS User Agent and the MMS Relay/Server (below referred to as MMS Server), are described in more detail therein.

Notifications of incoming MMS messages are delivered from the MMS server to the MMS User Agent by using WAP push. The MMS User Agent sends a WAP or HTTP GET in order to make the MMS server send an MMS message.

The transfer of Multimedia Messaging Services MMS messages is usually performed using the Wireless Application Protocol WAP or Hypertext Transport Protocol HTTP. Retrieval of an MMS message is then performed by sending a WAP or HTTP GET request, respectively.

Messaging services implemented for the IP Multimedia core network Subsystem IMS network are currently under discussion in the 3GPP. The IMS messaging services comprise messaging types immediate messaging, deferred delivery messaging, and session-based messaging. In immediate messaging, a message is delivered immediately from one user to another, whereas in deferred messaging it is delivered as soon as the recipient becomes available. In session-based messaging, a session has to be set up before any other communication can take place.

In the IMS network, the Session Initiation Protocol SIP is used for creating, modifying, and terminating sessions with one or more participants. Two methods defined in the SIP are SUBSCRIBE and NOTIFY. SUBSCRIBE is used by a subscriber terminal to subscribe to event packages at proxies or servers. Whenever an event belonging to the subscribed event package is triggered, the terminal is informed by using the SIP method NOTIFY.

It may be commercially of vital importance to be able to retrieve MMS messages directly from within IMS. This has, nevertheless and in spite of hard work, been impossible until now.

SUMMARY OF THE INVENTION

It is an objective of the invention to bring about new features to the Session Initiation Protocol SIP with which Multimedia Messaging Services MMS messages can be retrieved or delivered using the SIP protocol only.

The object of retrieving MMS messages using the SIP protocol can be achieved with a method according to the independent claim 1, or by using a terminal according to the independent claim 4.

The object of delivering MMS messages using the SIP protocol can be achieved with a method according to the independent claim 5, or by using an MMS server according to the independent claim 8.

Dependent patent claims describe various advantageous embodiments of the invention.

ADVANTAGES OF THE INVENTION

The devices and methods according to the invention enable using the SIP as single transport protocol for retrieving and delivering MMS messages. In this manner, the terminals do not need to have other protocols than SIP supported by their protocol stack, thereby helping to reduce manufacturing cost of the terminals. Further, because there are less protocols needed in the protocol stack, the probability for errors in the software is reduced, therefore also shortening testing period of the devices, resulting in a shorter time-to-market.

SHORT DESCRIPTION OF THE DRAWINGS

In the following, the preferred embodiments of the invention are described in more detail with reference to the accompanying drawings 1 to 4, of which:

DETAILED DESCRIPTION OF THE INVENTION

Figure 1:
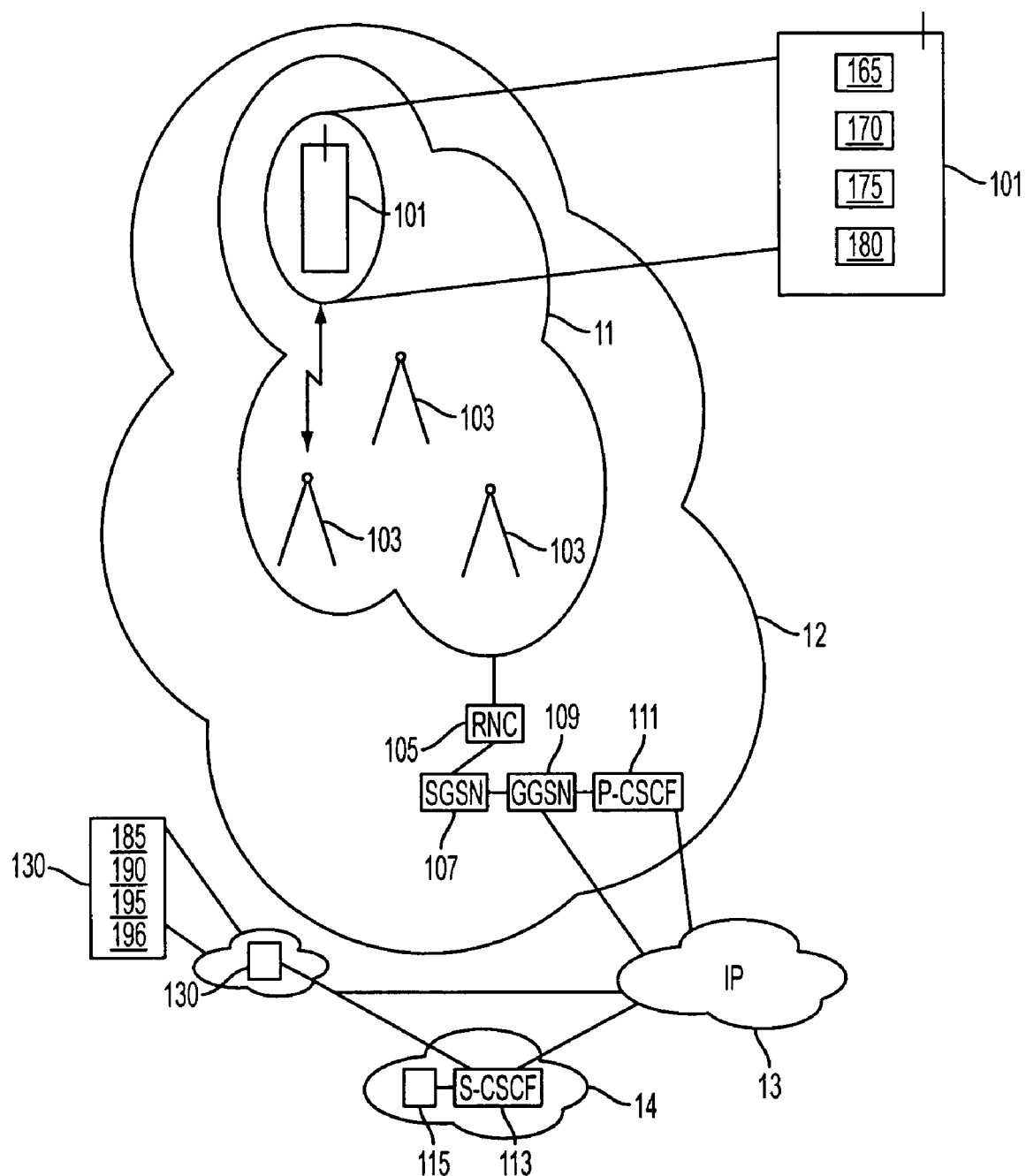
FIG. 1 shows a mobile network comprising also IP Multimedia core network Subsystem.

FIG. 1 shows a terminal 101 within a Radio Access Network RAN 11 of a mobile network 12. The RAN 11 comprises a plurality of Base Stations BS 103 controlled by a Radio Network Controller RNC 105, the terminal 101 communicating with the mobile network 12 wirelessly via a BS 103. Typically, one mobile network 12 comprises a plurality of RNC 105, but for simplicity FIG. 1 shows only one such RNC 105.

A terminal 101 has communication means 165, preferably those as commonly used for radio communications, and all related means for enabling a successful communication with the mobile network 12. Within the terminal 101, the processing unit 170 uses the communication means 165 in order to transmit and receive data. Both data to be transmitted and data received are filtered via the protocol stack 175 before any further operations are performed on them. The terminal 101 may have a plurality of applications stored in its memory. These applications include also an MMS User Agent 180 which takes care of all MMS specific interactions between the home network 14 and the terminal 101. The applications are run in the processing unit 170 and they use data obtained through the communication means 165 and filtered through the protocol stack 175.

For packet traffic, the mobile network 12 comprises a Serving GPRS Support Node SGSN 107 and Gateway GPRS Support Node GGSN 109. The terminal 101 obtains an IP address which is reserved up to the GGSN 109. The traffic between the terminal 101 and the GGSN 109 goes then on the GPRS Tunneling Protocol GTP protocol layer through the SGSN 107 and the RAN 11, wherein there are further specific radio interface layer protocols facilitating resource-efficient data transport over the air interface. As the skilled person appreciates, a more detailed description of the related protocols can be found in any of the various standards defining these mechanisms.

The terminal 101 may be roaming under mobile network 12 even though its home network 14 were elsewhere. The transmission of packet data is then performed either directly between the terminal 101 and its home network 14 or via any other network, especially the Internet 13.

The home network 14 comprises a Home Service Server HSS 115 which includes subscriber data and knows under which mobile network 12 the terminal 101 is roaming. A Serving Call State Control Function S-CSCF 113 is located in the home network 14 of the terminal 101. If the terminal 101 is roaming under another mobile network 12, then the S-CSCF 113 of home network 14 is used via a Proxy Call State Control Function P-CSCF 111. The P-CSCF 111 includes data about services subscribed for the terminal 101; this data has been transmitted from the S-CSCF 113 to the P-CSCF 111 as a response to a query sent by the P-CSCF 111.

In mobile telecommunication systems, such as in GSM and UMTS, the SIP is used for the IP multimedia core network Subsystem IMS. The IMS includes P-CSCF 111, S-CSCF 113, and servers providing some of the services. Especially for MMS messages, MMS server 130 is used as the server providing all MMS related services.

The MMS server 130 comprises communication means 185 for communication between terminals 101, with other MMS servers 130, and with servers in the Internet 13. The processing unit 190 of the MMS server 130 uses the communication means 185 as well as the protocol stack 195. The protocol stack 195 comprises IMS protocols enabling provision of different services. The protocol stack 195 may further comprise an MMS specific part. The MMS server 130 is running an MMS application 196 which takes care of registering event packet subscriptions, notifying subscriber terminals of received MMS messages belonging to a subscribed event packet, and delivering MMS retrievals in response to receiving MMS retrieval requests.

Figure 2:
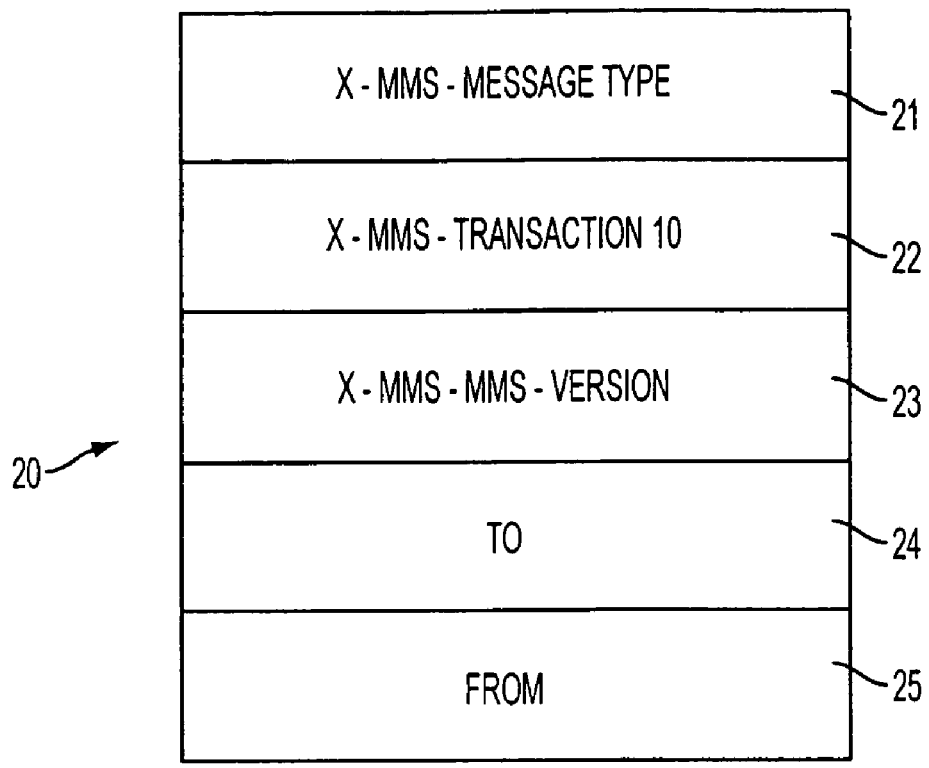
FIG. 2 shows the structure of a new SIP message used for retrieving or delivering an MMS message.

FIG. 2 shows the structure of the MMS part of the new SIP messages 20 used for subscribing an event package, or retrieving or delivering an MMS message. The SIP message 20 comprises fields 21 (X-Mms_Message-Type), 22 (X-Mms-Transaction ID), 23 (X-Mms-MMS Version), 24 (To), and 25 (From). These fields 21 to 25 are usually carried in the header of the SIP message 20.

Figure 3A:
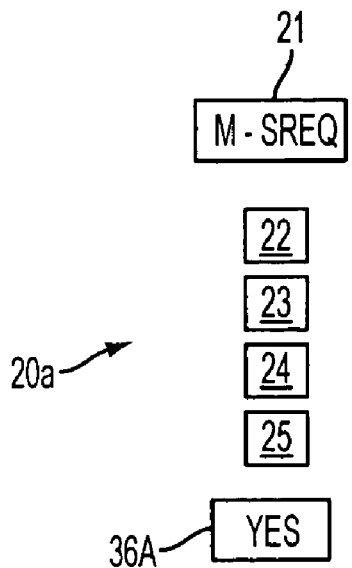
FIGS. 3a and 3b show the structure of two different SIP messages.
Figure 3B:
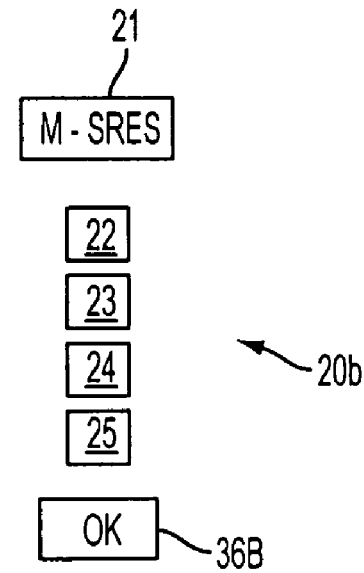

FIGS. 3a and 3b show the structures of two different SIP messages 20. The SIP message 20a used for carrying MMS subscription request message M401 is shown in FIG. 3a and comprises in its field 21 identifier "m-sreq" and further in field 36A flag "yes". The SIP message 20b used for carrying MMS subscription response message M403 is shown in FIG. 3b and comprises in field 21 identifier "m-sref", and further an acknowledgement "OK" in field 36B.

The skilled person appreciates that the examples shown in FIGS. 2, 3a, and 3b are schematic of their nature. More detailed description for all header and message formats can be found in IETF specifications RFC 3261 and 3265. RFC 3261 introduces the SIP and RFC 3265 introduces the SIP-Specific Event Notification. Both of these specifications define also the SIP methods later referred to in this description.

Figure 4:
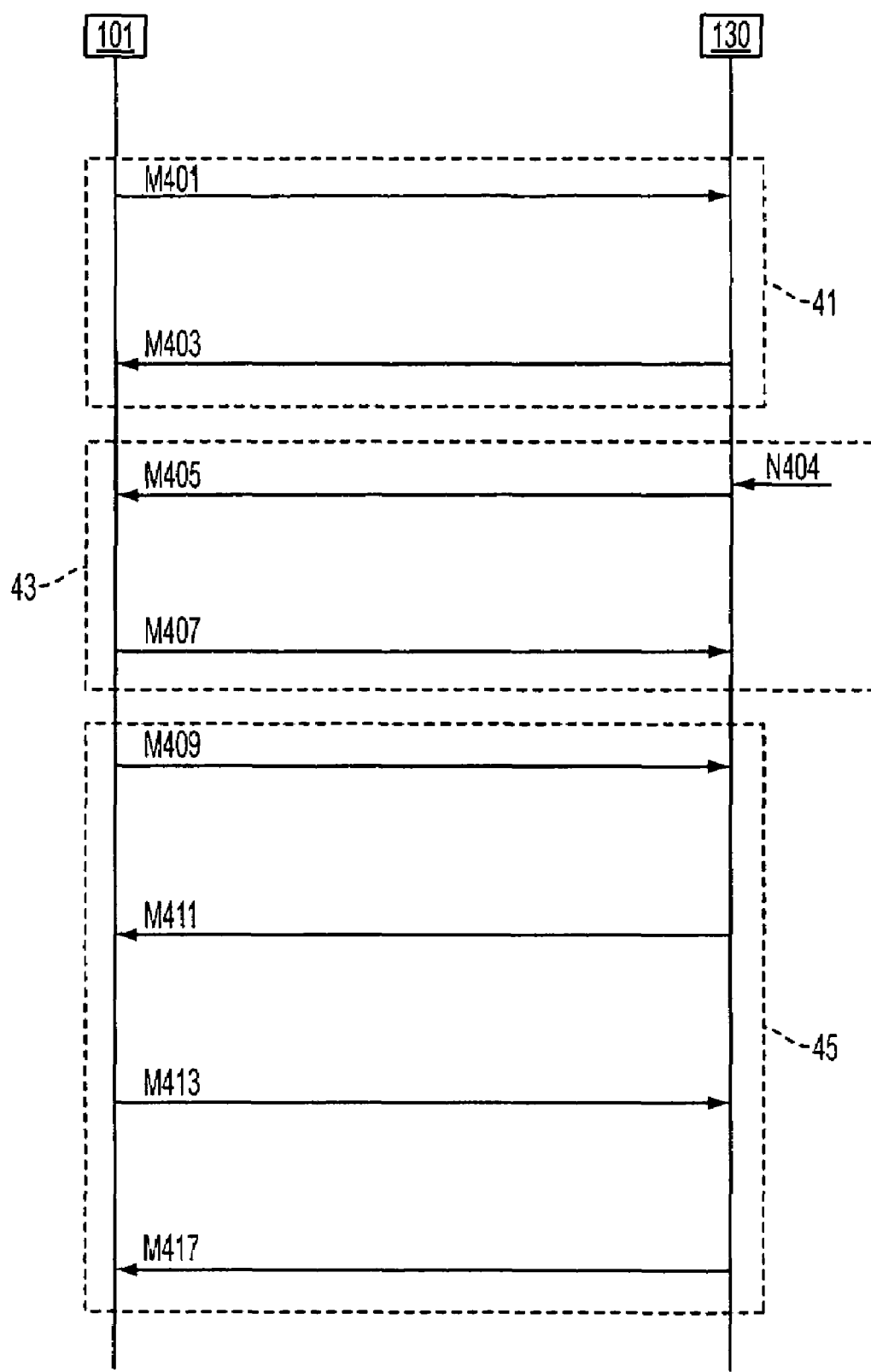
FIG. 4 shows messaging (41) used for subscribing an event package, messaging (43) used for notifying a terminal upon receipt of an MMS message, and messaging (45) used for downloading an MMS message to a subscriber terminal.

Dashed box 41 in FIG. 4 shows how an event package is subscribed. The MMS User Agent 180 requests by sending MMS subscription request M401 to the MMS Server 130 that the MMS Server 130 uses a SIP method NOTIFY for sending MMS notifications. MMS subscription request M401 has a form of message 20b shown in FIG. 3b, and it is sent by the terminal 101 as soon as it has been switched on for the first time and has network coverage. The MMS subscription request M401 is acknowledged by the MMS Server 130 with an MMS subscription response M403.

Dashed box 43 shows how the terminal 101 is informed upon receipt of MMS message N404. As soon as the MMS Server 130 receives the MMS message N404 which belongs to a subscribed event package, it sends MMS notification M405 to the MMS User Agent 180 informing it that the MMS message N404 has arrived at the MMS Server 130. The MMS User agent 180 responds to MMS notification M405 with MMS notification response M407.

Dashed box 45 shows how the MMS message N404 received by the MMS Server 130 can be downloaded to the terminal 101. In response to the MMS notification M405, the MMS User Agent 180 can decide to download the MMS message N404 by sending an MMS message retrieval request M409 to the MMS Server 130. MMS message retrieval request M409 is a SIP FETCH message.

In response to receiving MMS message retrieval request M409 the MMS Server 130 sends MMS message retrieval M411 to the MMS Server 130. MMS message retrieval M411 includes the contents of MMS message N404.

The MMS User Agent 180 acknowledges the receipt of the MMS message retrieval M411 by returning MMS message retrieval acknowledgement M413. In response to receiving MMS message retrieval acknowledgment M413 the MMS Server 130 responds with acknowledgement M417.

MMS subscription request M401; MMS subscription response M403; MMS notification M405; MMS notification response M407; MMS message retrieval request M409; MMS message retrieval M411; and MMS message retrieval acknowledgement M413 all have structures similar to those shown in FIGS. 3a and 3b except that the value in field 21 is changed accordingly to identify the kind of the message. The structure of these messages is otherwise as defined in 3GPP, TS 23.140 already referred above.

Messages M401 to M417 communicated between the terminal 101 and the MMS Server 130 are routed via BS 103, SGSN 107, GGSN 109, P-CSCF 111, and S-CSCF 113, if necessary.

For MMS subscription request M401 the header field "event" is set to value "mms" identifying the purpose of the MMS subscription request M401, i.e. that the MMS User Agent 180 requests the MMS Server 130 to use the SIP method notify for sending MMS notifications M405.

As in MMS subscription request M401, also in MMS notification M405 the header field "event" is set to value "mms", this informing the terminal 103 about the incoming MMS notification in MMS notification M405.

Messages M401 to M417 comprise SIP-specific header fields and MMS level header fields.

The MMS subscription request M401 is sent using the SIP method SUBSCRIBE. The MMS subscription request M401 comprises an event identifier defining that the SIP method NOTIFY is to be used for sending MMS notifications M405. After receiving an MMS notification M405, the terminal 101 generates and sends an MMS message retrieval request M409

In the first embodiment, the MMS level header fields are added to the header fields in the messages M401 to M417. Then the S-CSCF 113 analyses the SIP headers of each incoming message. If any MMS-specific headers is detected, for example by detecting a keyword "X-Mms-" in the fields, the S-CSCF 113 routes the message to the MMS Server 130. Similarly, all SIP messages received by the terminal 101 are checked for any MMS-specific headers, and if any is found, the message is passed to the MMS User Agent 180. An advantage of such a header structure is that all both SIP and MMS headers have a similar format and coding. In particular for a SIP-only terminal this reduces the implementation effort since a single coding scheme can be applied to the SIP protocol stack as well as to the application level.

In the second embodiment, the header fields of the SIP messages comprise SIP-specific header fields only. In this approach the MMS information is an attachment of the SIP message. The S-CSCF 113 checks if the attachment is an MMS message. If in the header field "Content-Type:" a keyword "application/vnd.wap.mms-message" is detected, this is most probably the case, and the message is then routed to the MMS Server 130. The header field "Content-Type:" of SIP messages received by the terminal 101 is in the same manner checked. If the header field comprises "application/vnd.wap.mms-message". The SIP message is passed to the MMS User Agent 180. An advantage of such a header structure and encoding is that in this manner a better compatibility with currently existing MMS systems can be achieved. In particular, terminals comprising a current MMS client software which is only ported to a SIP protocol stack, no extra encoder or decoder for processing the messages M401 to M417 is needed therefore making it easier to implement a terminal 101 supporting MMS functionalities.

Some of the acknowledgement messages, i.e. MMS subscription response M403, MMS notification response M407, and MMS message retrieval M411 are 200 OK messages. Further, they comprise relevant MMS headers, and MMS message retrieval M411 further includes the MMS message N404 received by the MMS Server 130. All these acknowledgement messages may either comprise SIP-specific header fields or in addition to the SIP-specific header fields also some MMS-specific header fields. In the former case the other data necessary is embedded in the payload.

The other acknowledgement messages, i.e. MMS message retrieval acknowledgement M413 and acknowledgement M417 are 200 OK messages too. Contrary to other 200 OK messages described above, they comprise no MMS-specific information.

LIST OF USED REFERENCE NUMERALS

11 Radio Access Network RAN
12 mobile network
14 home network
101 terminal
103 Base Station BS
105 Radio Network Controller RNC
107 Serving GPRS Support Node SGSN
109 Gateway GPRS Support Node GGSN
111 Proxy-Call State Control Function P-CSCF
113 Serving Call State Control Function S-CSCF
115 Home Service Server HSS
130 MMS Server
165 communication means
170 processing unit
175 protocol stack
180 MMS User Agent
185 communication means
190 processing unit
195 protocol stack
196 MMS application

The invention claimed is:

1. A method for retrieving a Multimedia Messaging Service (MMS) message, the method being executed at an MMS User Agent, the method comprising:
    generating an MMS subscription request;
    sending said MMS subscription request to an MMS server using a Session Initiation Protocol (SIP) method SUBSCRIBE;
    receiving an MMS notification of the MMS message from the MMS server using a SIP method NOTIFY;
    in response to receiving said MMS notification, generating an MMS message retrieval request for retrieving said MMS message;
    sending said MMS message retrieval request to the MMS Server using a SIP method FETCH;
    receiving an MMS message retrieval comprising said MMS message; and
    in response to receiving said MMS message retrieval from the MMS Server, sending an acknowledgment to the MMS Server using a SIP method INFORM.

2. The method according to claim 1, wherein
    each of said MMS subscription request, said MMS notification, said MMS message retrieval request, and said acknowledgment include an MMS specific header field, and
    the specific header fields are sent or received as attachments.

3. The method according to claim 1, wherein
    each of said MMS subscription request, said MMS notification, said MMS message retrieval request, and said acknowledgment contain an MMS specific header field, and
    the MMS specific header fields are sent or received in SIP header fields.

4. The method for delivering a Multimedia Messaging Service message (MMS), the method being executed at an MMS Server, the methodcomprising:
    receiving an MMS subscription request from a terminal using a Session Initiation Protocol (SIP) method SUBSCRIBE;
    receiving the MMS message;
    in response to receiving said MMS message, generating an MMS notification, and sending said MMS notification to the terminal using a SIP method NOTIFY;
    receiving an MMS message retrieval request from the terminal using a SIP method FETCH, the MMS message retrieval request requesting the MMS message;
    in response to receiving said MMS message retrieval request, generating an MMS message retrieval comprising the MMS message, and sending said MMS message retrieval to the terminal; and
    receiving an acknowledgment from the terminal using a SIP method INFORM.

5. The method according to claim 4, wherein
    each of said MMS subscription request, said MMS notification, said MMS message retrieval request, and said acknowledgment include an MMS specific header field, and
    the specific header fields are received or sent as attachments.

6. The method according to claim 4, wherein
    each of said MMS subscription request, said MMS notification, said MMS message retrieval request, and said acknowledgment include an MMS specific header field, and
    the MMS specific header fields are received or sent in SIP header fields.

7. An MMS server comprising:
    a processor to:
    receive an MMS subscription request from a terminal using a Session Initiation Protocol (SIP) method SUBSCRIBE;

receive the MMS message;

in response to receiving said MMS message, generate an MMS notification, and sending said MMS notification to the terminal using a SIP method NOTIFY;

receiving an MMS message retrieval request from the terminal using a SIP method FETCH, the MMS message retrieval request requesting the MMS message;

in response to receiving said MMS message retrieval request, generate an MMS message retrieval comprising the MMS message, and sending said MMS message retrieval to the terminal; and receive an acknowledgement from the terminal using a SIP method INFORM.

8. A terminal to retrieve a Multimedia Messaging Service (MMS) message, the terminal comprising:

a processor to generate an MMS subscription request;

a transceiver to:

send said MMS subscription request to an MMS server using a Session Initiation Protocol (SIP) method SUBSCRIBE; and receiving an MMS notification of the MMS message from the MMS server using a SIP method NOTIFY;

wherein in response to receiving said MMS notification, the processor generate an MMS message retrieval request for retrieving said MMS message;

the transceiver:

sends said MMS message retrieval request to the MMS Server using a SIP method FETCH;

receives an MMS message retrieval comprising said MMS message; and in response to receiving said MMS message retrieval from the MMS Server, sends an acknowledgment to the MMS Server using a SIP method INFORM.

* * * * *